Apr. 17, 1923.

W. C. HUEBNER 1,452,077

PHOTOGRAPHIC PROJECTION PRINTING APPARATUS

Filed Sept. 29, 1919

INVENTOR.
William C. Huebner
By
Parker & Prochnow.
ATTORNEYS.

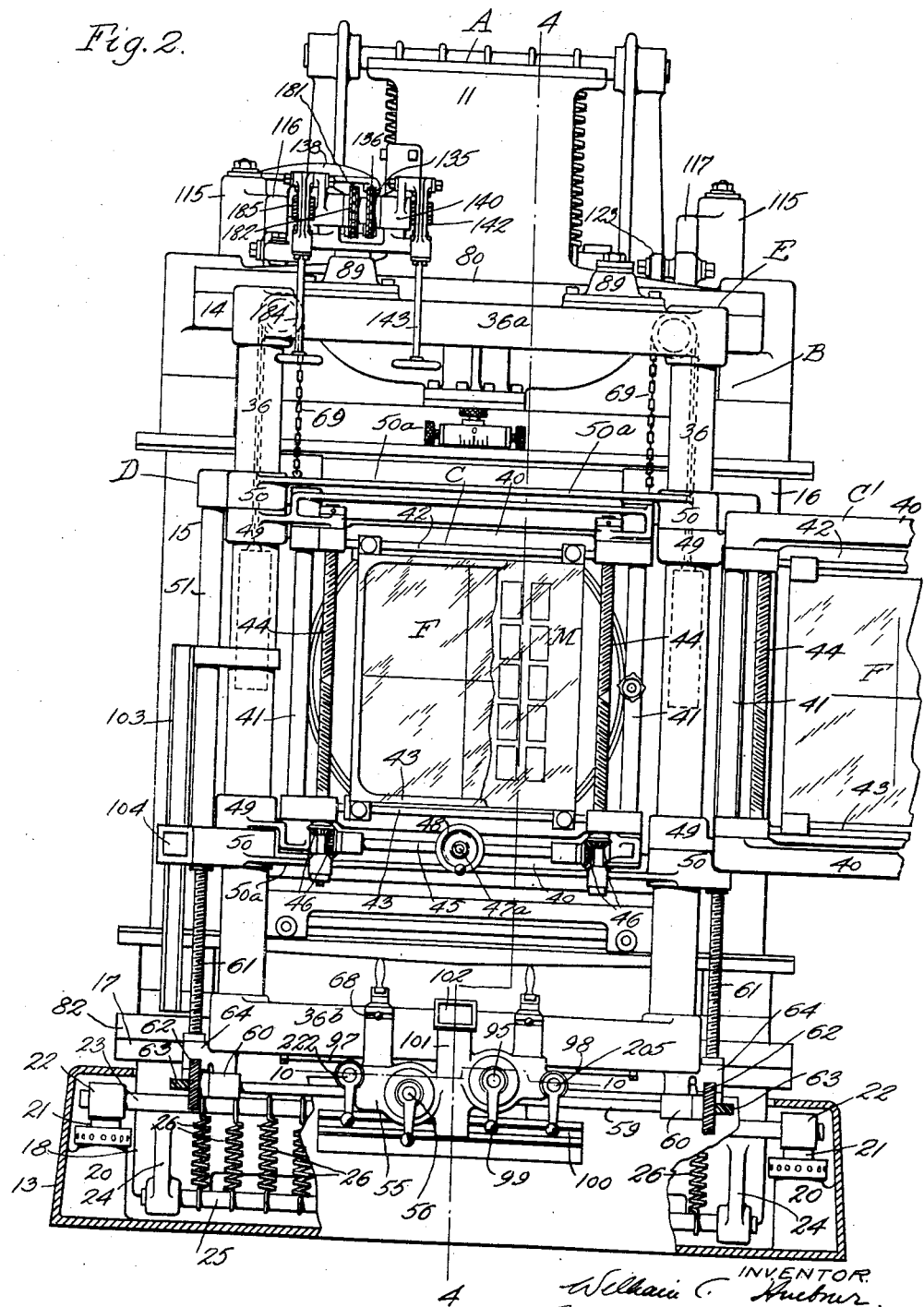

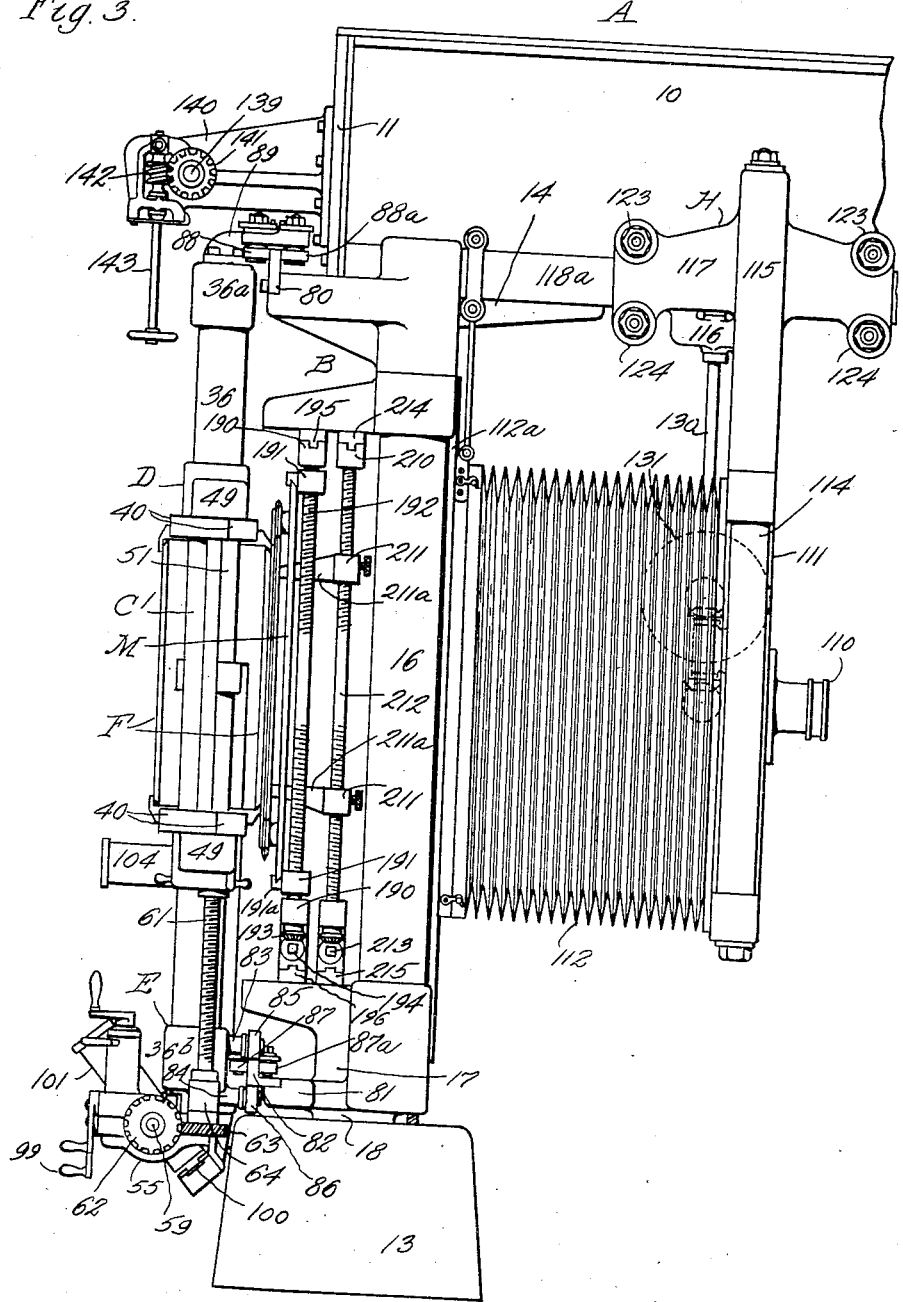

Apr. 17, 1923.
W. C. HUEBNER
1,452,077
PHOTOGRAPHIC PROJECTION PRINTING APPARATUS
Filed Sept. 29, 1919
7 Sheets-Sheet 4
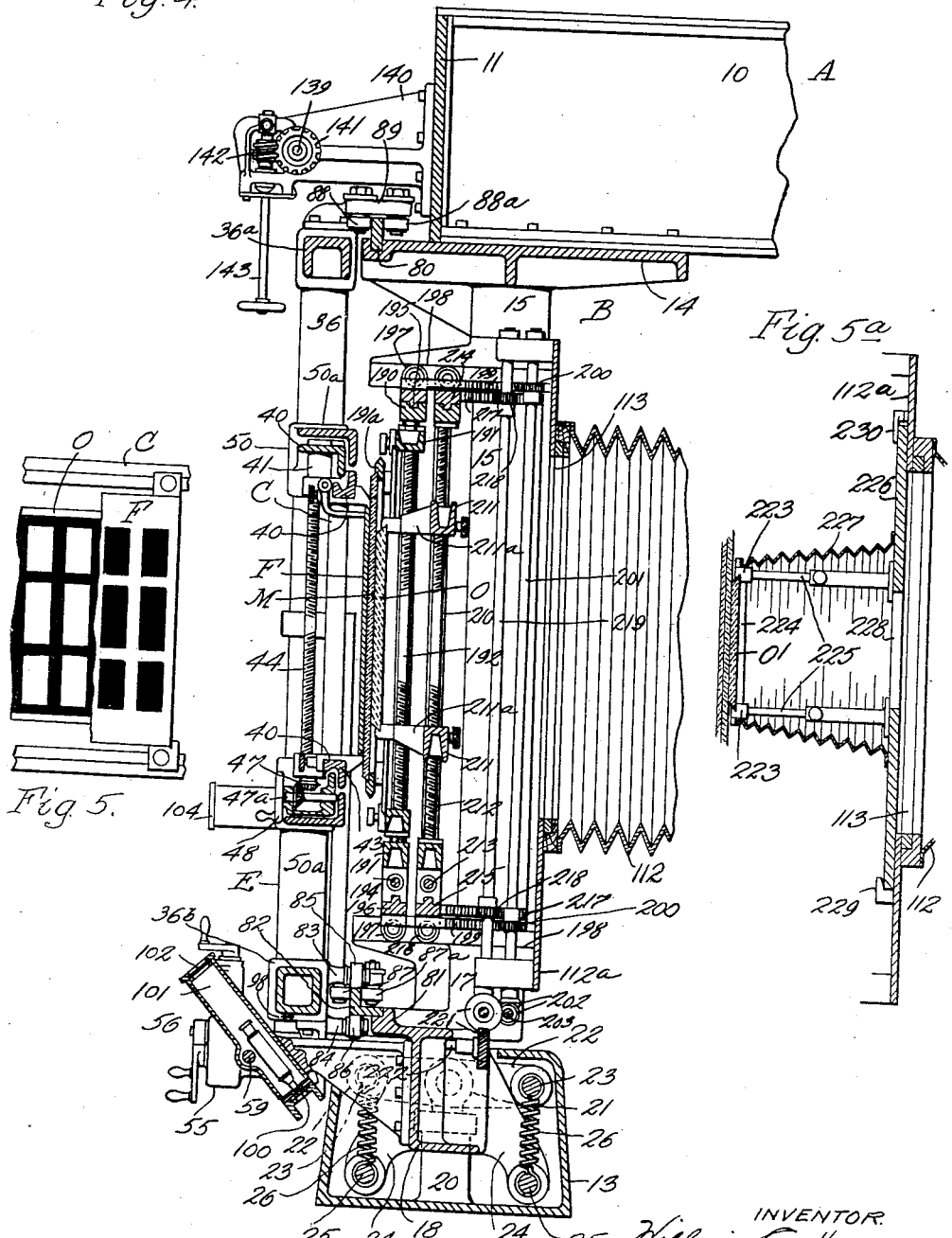

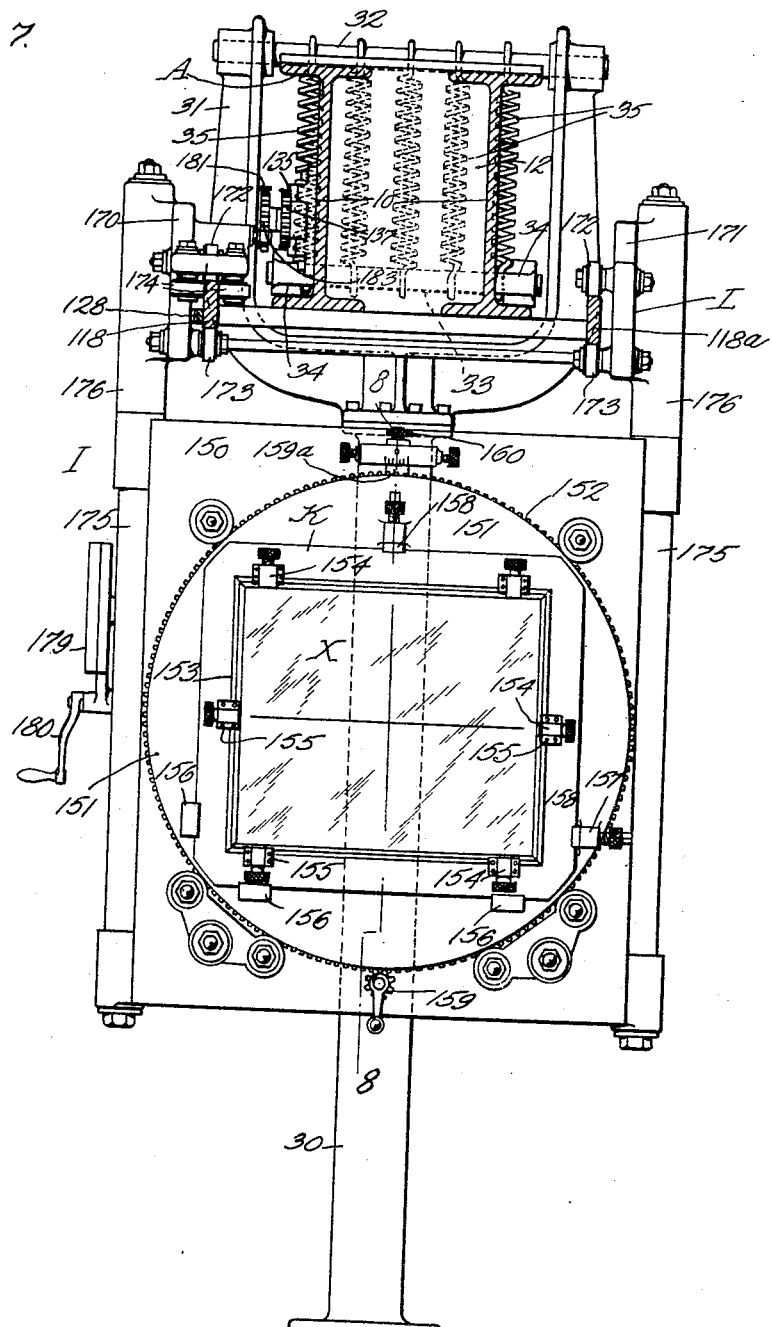

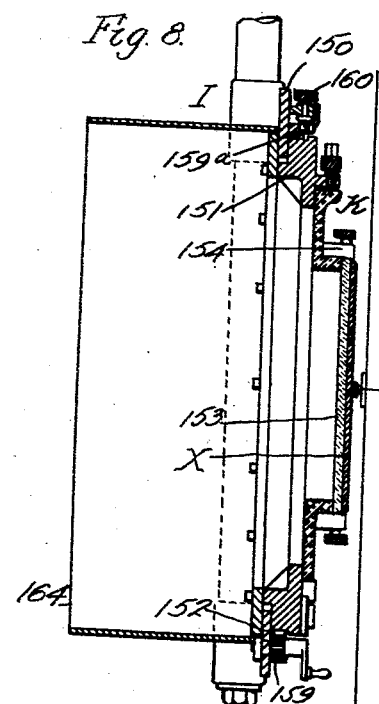
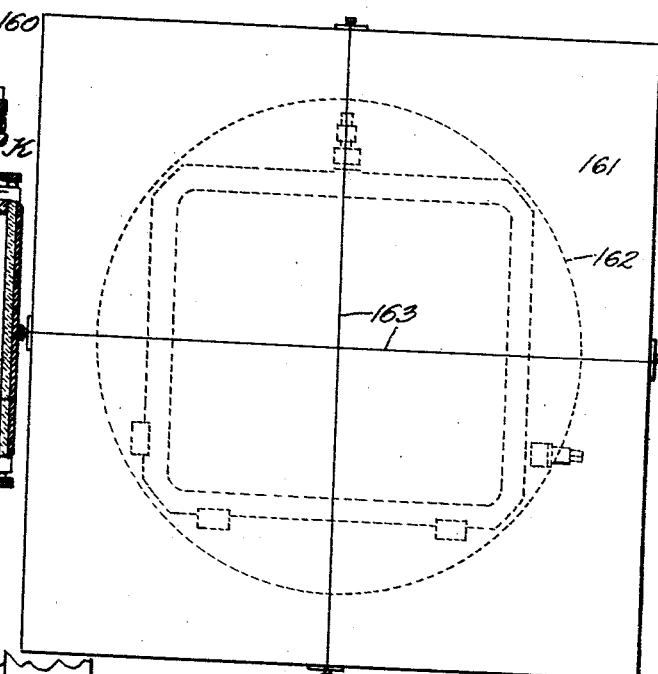
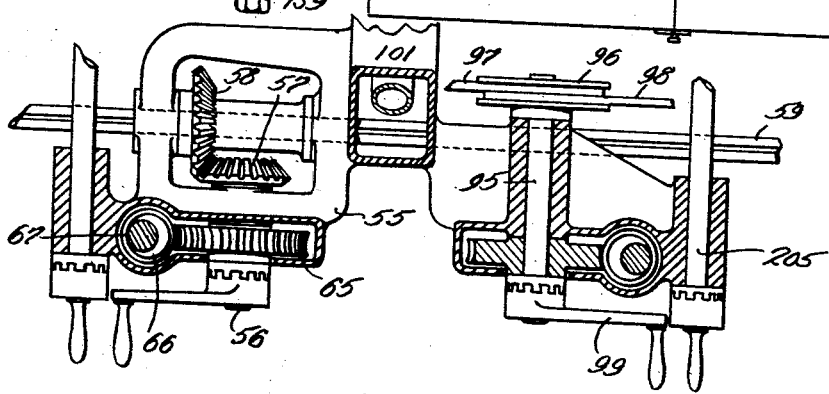

Patented Apr. 17, 1923.

1,452,077

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

PHOTOGRAPHIC-PROJECTION PRINTING APPARATUS.

Application filed September 29, 1919. Serial No. 327,244.

*To all whom it may concern:*

Be it known that I, WILLIAM C. HUEBNER, a citizen of the United States, residing at Buffalo, in the county of Erie and State of New York, have invented a new and useful Improvement in Photographic-Projection Printing Apparatus, of which the following is a specification.

This invention relates to improvements in photographic projection printing apparatus or cameras for making photographic reproductions, with or without enlargement or reduction, from either transparent or opaque copies; and more particularly to an apparatus or camera of this kind which is adapted to make several exposures from copies of like or different size and kind on a single negative or printing plate.

In the so-called repeat exposure projection apparatus or cameras used heretofore, it has been found that it is impossible to make two or more single negatives, each carrying two or more exposures, made from two or more like or different size copies, if for any reason one of these copies has been removed from the copy holder after the first single plate has been exposed, and it is required that the images of two or more single plates should register precisely as to size, alinement and relative arrangement, or that all the images on two or more single plates should register exactly when superimposed upon a printed sheet or plate.

One of the objects of the invention is to produce an apparatus for photographing from either transparent or opaque copies, with or without enlargement or reduction, any desired number of like or different original exposures in any predetermined registered position and relative arrangement upon the sensitized surface of transparent glass negatives or other printing plates.

After such repeat or combination exposures are made upon one plate, the herein described apparatus is adapted to repeat upon a second plate or any number of single plates, similar exposures from the same copies, so that all of the images on the plates will register exactly when superimposed upon a printed sheet or plate. The apparatus is likewise adapted for use in making negatives or positives for multi-color printing where it is necessary that the reproductions of the copy or images on the printing surfaces for the different colors, be in exactly corresponding or registering position and on the same scale. For example, in gravure work for newspapers, magazines and catalogues where the illustrations are made up from various size copies, this apparatus will save much of the time now required with other cameras to make separate negatives from each different sized copy. With the use of this apparatus, it is possible to photograph directly from the various copies all of the subjects for one or more pages upon a single plate and thus save additional time in making the press plates by contact printing.

The apparatus, hereinafter described in detail as the preferred embodiment of the invention, comprises a photographic projecting device with one or more lenses, a holder or device for supporting the copy or subject to be reproduced, a holder or carrier for the sensitized plate, a holder or carrier for a lay-out, master plate, or visual register focus plate, a holder for masks, and holder for a photographic screen. All of these elements are preferably supported or held by an overhead floating support or track. In the co-ordination of these various parts, correct functioning is necessary to secure good results; for instance, the sensitized plate holder must travel in line with the vertical and horizontal alinement of the copy, the visual register focus plate must also travel in the same alinement with both the copy and the sensitized plate.

In this apparatus means are provided to ensure the accurate positioning of the image on the copy holder in a predetermined position so that the same or other images can be removed and replaced in precisely the same registered location and alinement, and focused to the required size upon the sensitized surface. Means are also provided to rotate and hold the copy on a center so that a suitable copy can be adjusted and exposed in predetermined angular positions with the edges or margins of each image accurately in line without showing any overlap or any gap between the successive images so exposed on a single plate; also to permit making a number of such composed plates, so that all the composed images of each single plate made from the same copies will all register when superimposed upon a printed sheet or plate.

Masking of the sensitized plate when making successive exposures from various copies on the same plate is essential. A system of holders and masks is therefore provided so that the desired portion of the sensitized plate can be exposed without light action affecting the other parts of the plate. Provisions are also made so that a copy can be focused as to size and location upon the visual register plate and the masks can be adjusted to exact register with the image on the visual register plate, thus providing complete and easy control for placing masks in the desired locations. The apparatus is preferably arranged to allow for placing either a swing frame holder for the sensitized plate, or a swing frame holder for the visual register focus plate opposite the masks. Hence an exposure can be made upon the sensitized plate in the exact locations required by the visual register focus plate on which the image was positioned and focused.

The production of an apparatus by which the above mentioned results can be attained in a satisfactory and efficient manner constitutes another object of the invention.

Still another object of the invention is to improve apparatus of the nature stated in the various respects hereinafter described and set forth in the claims.

In the drawings, consisting of seven sheets:

Fig. 2 is a front elevation, partly in section thereof, on an enlarged scale.

Fig. 3 is a fragmentary elevation of the front part of the apparatus, showing the side opposite to that shown in Fig. 1.

Fig. 4 is a fragmentary longitudinal sectional elevation thereof in line 4—4, Fig. 2.

Fig. 5 is a fragmentary front elevation of a portion of a key plate mounted in one of the holders for the sensitized plates, with a portion of a registering mask in rear thereof.

Fig. 5a is a fragmentary longitudinal sectional elevation illustrating the use of one form of mask.

Fig. 7 is a vertical sectional elevation thereof on line 7—7, Fig. 6.

Fig. 8 is a fragmentary longitudinal vertical section on line 8—8, Fig. 7, showing the means for supporting and adjusting a transparent copy on the apparatus.

Fig. 9 shows a form of holder which is adapted to be used for supporting an opaque copy in the apparatus.

Fig. 10 is a fragmentary horizontal section, on line 10—10, Fig. 2, showing the means for operating the horizontal and vertical carriages for the sensitized plates.

Figure 1:
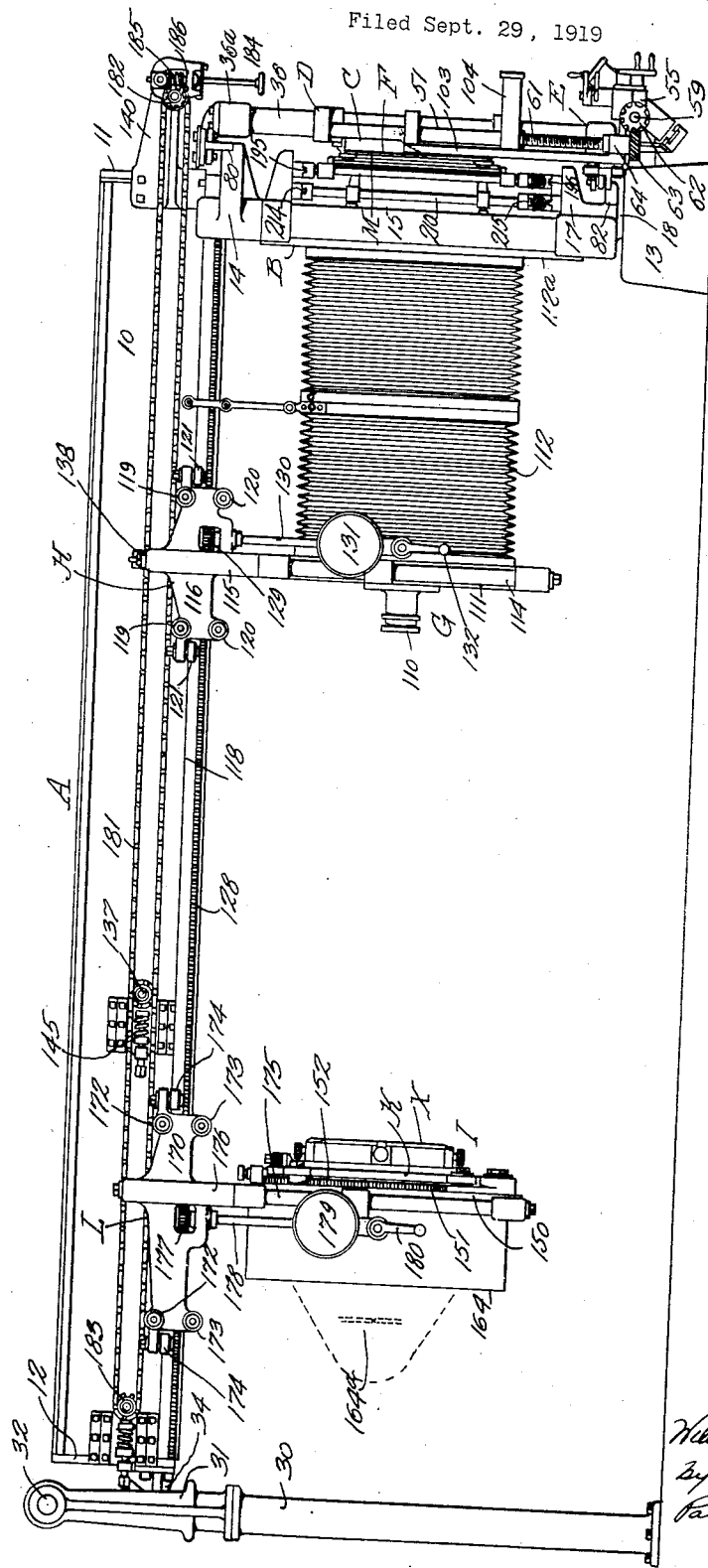
Fig. 1 is a side elevation of a photo-composing or projection printing apparatus embodying the invention.

The apparatus preferably has a frame including a floating overhead member or support from which the various elements, together with their operating means, are suspended. The overhead support preferably comprises a longitudinal horizontal structural member A composed of two parallel I-beams 10 extending substantially from the front to the rear of the apparatus and which are connected at their opposite ends by plates 11 and 12. To the underside of the member A at the front thereof, is rigidly connected a depending housing or frame-work B, the lower end of which is yieldingly supported in a hollow transverse base member or casting 13 which rests on the floor. This housing B is preferably constructed and supported in the following manner:

A transverse crosshead or casting 14 is bolted or otherwise secured to the lower horizontal flanges of the I-beams 10 and is connected at its opposite ends by vertical tubular posts or standards 15, 16, to a lower transverse yoke or casting 17, forming a substantially rectangular frame, the purpose of which will be later described. The yoke 17 has a depending member or part 18 which extends into the base 13, and is constructed to permit it to be yieldingly connected to said base, thereby providing a floating support for the housing B and the front end of the elevated member A. Any suitable means may be used for permitting the yielding action between the housing B and the base 13, those shown in the drawings being constructed as follows:

The base 13 is provided at its opposite ends with sockets or lugs 20, see Figs. 2 and 4, in which bearing members 21 are secured, each having a forwardly and rearwardly extending lever 22 pivoted centrally thereon. A pair of parallel, transverse, horizontal shafts or rods 23 are arranged on opposite sides of the depending member 18 of the yoke 17 with their ends secured to the levers 22. The member 18 is also provided at each end with a pair of oppositely disposed arms 24 for the reception of a second pair of transverse shafts 25 arranged beneath the shafts 23 and to which they are yieldingly connected by a plurality of coil springs 26. This construction provides a very desirable, strong and steady resilient means for supporting the front part of the apparatus.

For yieldingly supporting the rear end of the elevated support A, a fixed vertical post or standard 30 is provided, having at its upper end laterally and upwardly extending arms 31. A transverse rod 32 has its ends bearing in holes in the arms 31. A similar rod 33 is secured in brackets 34 which are fixed to and extend rearwardly from the plate 12 of the support A and the rod 33 is yieldingly suspended from the rod 32 by coil springs 35. The support A and housing B, together with the devices suspended therefrom, are thus mounted in such manner as to prevent any vibrations or shocks which may arise in the vicinity thereof, from affecting the relative positions to which the operative parts of the apparatus may be set.

The means shown in the drawings for supporting the sensitized and lay-out, master or visual register plates in the apparatus and for providing the various adjustments therefor preferably include two oppositely disposed, hinged carrying frames C C' which are arranged in a vertical carriage D and are adapted to swing forwardly and laterally from overlapping positions to positions at opposite sides of the carriage, being pivoted on tubular uprights 36 at the opposite sides of a horizontally adjustable main carriage E and on which they are adjustable up and down by the movement of the vertical carriage, to provide the vertical adjustment for the sensitized plates. The main carriage E is movable transversely of the apparatus in a plane parallel with the planes of the sensitized plates when they are in printing position. This carriage comprises the tubular uprights 36 above mentioned, which are connected at their upper and lower ends by horizontal cross members 36ᵃ, 36ᵇ, forming a substantially rectangular open vertical frame which is adapted to move on the housing B to effect the horizontal adjustment of the sensitized plate or plates F.

The carrying frames C C' are alike and each comprises top and bottom horizontal cross bars 40 connected by vertical end rods 41 forming a rigid rectangular open frame. The sensitized or other plates F are secured in these frames by means of upper and lower horizontal bars 42, 43, which are adjustable towards and from each other by means of screw shafts 44, each having oppositely threaded ends which engage in threaded holes in the ends of the bars 42, 43. For simultaneously rotating the screws, a horizontal shaft 45 is used which is connected to the screw shafts by bevel gears 46 and is turned by bevel gears 47 connecting the shaft 45 to a forwardly extending shaft 47ᵃ provided with a hand wheel 48, or otherwise, for turning it. Each of the carrying frames C C' shown is connected to one upright 36 of the main carriage E by two bearing lugs 49 on the cross bars 40, and in contact with bearings 50 of upper and lower horizontal cross bars 50ᵃ of the vertical carriage D. These cross bars 50ᵃ are connected at their ends by vertical tie rods 51. The vertical carriage D is adapted to move up and down on the main carriage E, and in its movement will impart a corresponding vertical movement to both carrying frames C C'. The carriage D is adjusted vertically by the following mechanism:

A bracket 55, see Figs. 1, 2 and 10, at the front of the housing B carries a short horizontal shaft 56, having at its outer or front end a clutch collar for engagement with a crank for turning it. To the inner end of the shaft 56 is secured a bevel pinion 57 meshing with a bevel pinion 58 splined on a horizontal shaft 59 journaled in bearings 60 on the main carriage E. The opposite ends of this shaft 59 are operatively connected to two vertical screw shafts 61 by spiral gears 62, 63.

The lower ends of the screw shafts 61 are journaled in bearings 64 on the main carriage E and the upper ends thereof are engaged by threaded nuts on the vertical carriage D, so that by turning the shaft 56, both screw shafts will be turned simultaneously and raise or lower the vertical carriage D. This constitutes a coarse adjustment for the vertical carriage. For effecting a fine, accurate adjustment thereof, the following mechanism may be used: A worm wheel 65 (see Fig. 10) is secured to the shaft 56 and is adapted to be engaged by a worm 66 on a vertical shaft 67 which is journaled in an eccentric bushing 68 and operated by a suitable crank. The bushing is mounted in a sleeve on the bracket 55 and may be turned to throw the worm 66 into or out of engagement with the worm wheel 65, the worm being in engagement therewith only when it is desired to effect the fine adjustment. Any other suitable means may be employed for this purpose.

As shown in Fig. 2, the carriage D may be counterbalanced by means of weights, movable up and down in the tubular uprights 36 of the main carriage, being suspended on chains or the like 69 passing over pulleys at the upper end of the main carriage.

The main carriage E is mounted and guided in its movements on the housing B in the following manner:

At the front of the crosshead 14 is secured a transverse rail or bar 80, and on a forwardly extending flange 81 of the depending member 18 of the housing is another horizontal rail 82. Extending rearwardly from the lower cross bar 36ᵇ of the carriage E near the ends thereof are studs 83, 84, disposed in such manner that rollers 85, 86, journaled thereon, engage the upper and lower edges respectively of the rail 82, the rollers 85 carrying the weight of the carriage and the rollers 86 preventing a vertical movement thereof. Additional rollers 87, 87ª, secured to the cross-bar 36ᵇ but with their axes arranged vertically, engage the front and rear faces respectively of the rail 82 for guiding and steadying the carriage and preventing undesirable movement thereof longitudinally of the apparatus. Similar rollers 88, 88ª, mounted on brackets 89, are secured to the upper cross bar 36ª of the main carriage E and engage the front and rear faces respectively of the upper rail 80 for guiding and steadying the upper part of the carriage E.

The means for moving the main carriage are preferably constructed as follows: (See Figs. 2 and 10.)

A short horizontal shaft 95 mounted in the bracket 55 has secured to its rear end a drum 96, on the periphery of which are fastened two steel bands or cables 97, 98, extending transversely in opposite directions and having their outer ends secured near the opposite ends of the cross bar 36ᵇ of the carriage E. This construction is such that when the shaft 95 is turned by means of a crank 99 to move the carriage, to the left, for instance, in Fig. 2, the band 98 will wind up on the drum 96 while the band 97 will unwind therefrom. If it is desired to move the carriage in the opposite direction, the shaft is turned the other way, when the band 97 will wind up on the drum and the band 98 will unwind therefrom. This is the coarse adjustment for the carriage, the fine adjustment being effected by a worm and worm wheel in a manner similar to the fine adjustment described for the vertical carriage D.

The adjustment of the main carriage E is preferably indicated by a graduated scale 100 secured thereto and adapted to move beneath a microscopic projection device 101 arranged on the bracket 55. The scale is preferably transparent and is illuminated by a small electric lamp. The microscope projects an enlarged image of the scale onto a ground glass 102. A similar arrangement is provided for the vertical carriage D including a scale 103 secured thereto, and a microscopic device 104 (see Fig. 2).

Any other suitable devices for giving accurate readings of the adjustments of the horizontal and vertical carriages may be used.

Means of novel construction are provided for supporting and adjusting the projection device and copy holder on the overhead member A. The projection device G shown in the drawings (see Figs. 1, 3 and 4) includes a rearwardly extending lens 110 mounted in a lens board on a frame 111. A bellows or other extensible, light-excluding device 112 is attached at one of its ends to the back of the frame 111 and at its other end to a plate or shield 112ª which is rigidly secured to the back of the housing B. The shield 112ª has a rectangular opening 113 therein for the passage of light, said opening being surrounded by the bellows 112. At the sides of the frame 111 are secured vertical bars 114 which are secured in and depend from sleeves or sockets 115 formed on or secured to side frames 116, 117 of a carrier or truck H movable longitudinally of the apparatus on horizontal guides or tracks 118, 118ª of the elevated support. At opposite ends the truck side frame 116 is provided with rollers 119, 120, which engage the upper and lower edges respectively of the guide 118. Additional rollers 121, Fig. 1, mounted on vertical studs on the ends of the side frame 116, engage opposite sides of the guide 118. The other side frame 117 is provided with upper and lower rollers 123, 124, arranged like the rollers 119, 120, these rollers engaging the upper and lower edges of the guide 118ª. Thus the rollers 119 and 123 support the carrier H, while the rollers 120, 124, are used to prevent vertical movement thereof, while all lateral play is effectually prevented by the rollers 121.

For actuating the carrier H to permit the adjustment of the projection device G, both coarse and fine adjustments are provided, the coarse adjustment shown in the drawings being preferably constructed as follows, see Fig. 1:

On one side of the guide 118 is formed or secured a rack 128 extending substantially the whole length of the elevated support A and adapted to be engaged by a pinion 129, on the end of an upright shaft 130 having a bearing in the side frame 116 and extending downwardly therefrom. The other end of this shaft is suitably geared to a micrometer device 131 which is adapted to give accurate and minute readings of the movements of the projection device, so that a record may be kept of the adjustments thereof for repeat exposures and the like. A suitable crank 132 is used to rotate the shaft 130 and pinion 129 through the described connections. For effecting the fine adjustment of the projection device G, the following mechanism is preferably used:

A sprocket chain 135, passing around front and rear sprocket wheels 136, 137, has one of its runs connected to a part 138 on the side frame 116. The sprocket 136 is secured to one end of a sleeve which surrounds a shaft 139 bearing in a bracket 140 which extends forwardly from the front of the support A, the other end of said sleeve having secured thereto a worm wheel 141 in mesh with a worm 142 on an upright shaft 143 (see Figs. 2 and 3). A hand wheel for turning this shaft and worm is secured to the lower end of the shaft 143 in a position where it may be readily grasped by an operative while observing an image on the transparent layout or register plate F, in one of the plate-carrying frames C C'. Thus by turning the hand wheel the chain will be caused to move the carrier H to obtain the fine or final adjustment of the projection device G. A suitable slack adjuster 145 is preferably provided to take up any looseness in the sprocket chain 135.

A copy holder or supporting device I is provided which is adapted to support either a transparent negative or positive, or an opaque copy, such as a painting, lithograph, or the like. The copy holder is suspended from and moved by a carrying frame and operating devices on the support A in a similar manner to the projection device and is provided with means for securing the copy in an exact predetermined location, and so that it may be adjusted rotatably to accurately place it in any desired angular relation in the vertical plane thereof.

These holding and adjusting means as shown in the drawings, see Figs. 7 and 8, are substantially like those shown in my pending application, Serial No. 279,493, filed Feb. 27, 1919, for holding and adjusting the printing plates in photographic contact printing apparatus. Briefly described, these means comprise a supporting plate 150 provided with a circular opening over which is adjustably secured a copy frame K on an index head 151 rotatably secured in the opening in the plate 150. The index head consists of a circular disk having a central opening and a peripheral gear ring 152. The copy frame K comprises a rectangular open frame carrying a fixed glass back plate 153 on the face of which is adjustably secured the copy X which, in Figs. 7 and 8, may be either a glass negative or positive printing plate. Adjustable holding jaws or devices 154, movably secured on blocks 155, hold the copy in position. The copy frame K bears against suitable fixed stops 156 and is secured in this position by adjustable locking wedges or devices 157 and 158. The index head is rotated by suitable means, such as a pinion 159 which meshes with the gear ring 152, and the head is locked in the required position by a dog 159$^a$ which is adapted to be moved into and out of engagement with the teeth of the gear ring by a screw 160 and is adjustable tangentially relative to the index head to enable a fine, accurate adjustment of the index head.

The copy X can be centered on the frame K by means of the adjustable jaws 154, and when the frame is secured against the fixed stops on the index head, the centers of the copy and of the index head will coincide accurately with each other and with the optical axis of the projecting lens. The index head can then be rotated to place the copy in any desired angular position, indicated by any suitable kind of indicator. In this way different copies can be centered and placed in exactly corresponding positions on the copy holder.

In Fig. 9 is shown a support or board 161, provided on the back thereof with a frame 162 similar to the copy frame K. This board is provided with cross lines or hairs 163 which enables an opaque copy to be accurately adjusted in the same manner as the transparent copy. On the back of the supporting plate is preferably secured a hood or the like 164 which is adapted to confine the light from the source of illumination, such as the arc lamp 164$^a$, which is used to illuminate the transparent copy.

Figure 6:
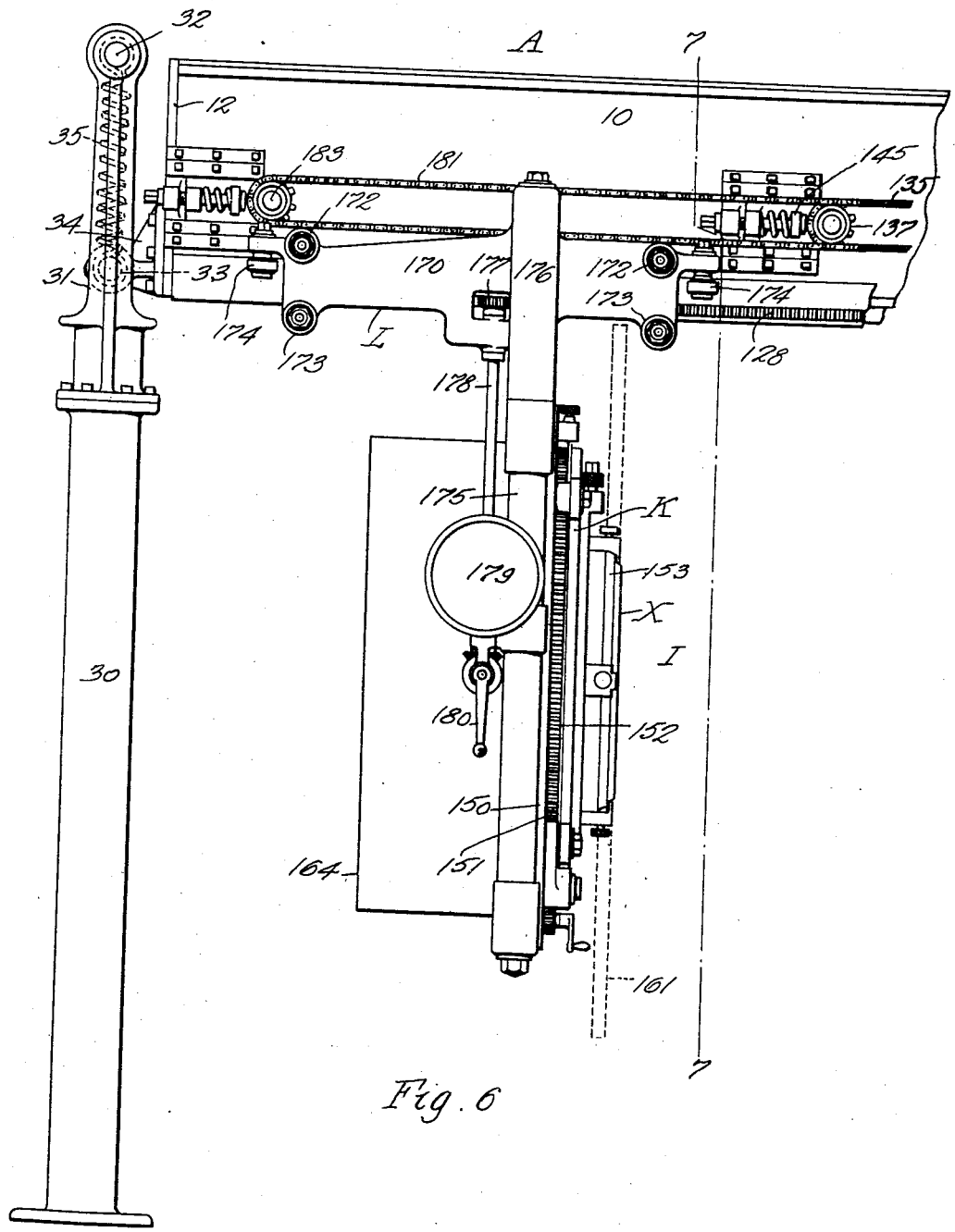
Fig. 6 is a fragmentary elevation of the rear portion of the apparatus, on an enlarged scale.

The carrier or truck L for the copy holder I is adapted to roll or travel longitudinally of the apparatus on the same guides 118, 118$^a$ as used for the truck H of the projection device. This truck L comprises side frames 170, 171, having supporting and retaining rollers 172, 173, see Figs. 6 and 7, and guide rollers 174 and the copy holder I is connected to the side frames by rods 175 which enter sockets 176. The coarse adjustment for the copy holder is provided with a pinion 177 which engages the rack 128 and is secured to a shaft 178. This shaft is turned and the movement of the carrier is indicated by a micrometer device 179 and suitable gearing, operated by a crank 180.

The fine adjustment for the copy holder I includes a sprocket chain 181, connected to the carrier L and passing around front and rear sprockets 182, 183. The front sprocket is secured to a sleeve on the shaft 139 before mentioned and is turned by means of an operating shaft 184, worm 185 and worm wheel 186 in a manner similar to the device used for the fine adjustment of the projection device.

M, Figs. 3 and 4, represents a ruled screen, or other desirable screen which is arranged in a frame 190, between oppositely adjustable horizontal bars 191, having suitable gripper jaws 191$^a$. These bars are moved toward and from each other by means of screw shafts 192 which have right and left-hand threads and are simultaneously turned by bevel pinions 193 connecting them to a horizontal shaft 194 which is, in turn, rotated by any suitable means, such as a crank engaging one end of the shaft. The frame 190 is inserted into the apparatus from the side and is adapted to engage upper and lower guides 195, 196. For moving the screen M to and from the sensitized plate the following means are preferably used:

The guides 195, 196 are provided with rollers 197 engaging fixed ways 198 in the housing B and rearwardly extending rack bars 199, secured to the guides 195, 196 at their ends, are engaged by pinions 200 on upright shafts 201 rotatable in bearings in the housing B. The shafts 201 and pinions 200 are rotated simultaneously by means of bevel pinions 202 connecting them to the opposite ends of a horizontal shaft 203. This shaft is connected by spiral gears to a shaft 205, Fig. 2, which extends forwardly through the bracket 55 and is provided at the front end with a crank for turning it. The connections between the shafts 203 and 205 are not shown in the drawings, but they are similar to the corresponding mechanism for the mask O which is shown in Fig. 4.

A suitable mask O adapted to register with portions of the sensitized plate, to confine the light action within predetermined limits, is shown in Figs. 4 and 5. This mask is mounted and adjusted in a similar manner to the screen M, in a frame 210. The frame includes oppositely movable bars 211, with gripper jaws 211ª, operated by screw shafts 212 geared to a horizontal shaft 213. The jaws 211ª are preferably adjustable relative to the bars 211, to permit the mask to be adjusted to the required position, parallel with the sensitized plate. This frame engages guides 214, 215 provided with supporting rollers 216 and rearwardly extending racks 217. These racks are engaged by pinions 218 on shafts 219 connected by bevel gears to a longitudinal shaft 220 which is connected by spiral gears 221 to a forwardly extending operating shaft 222 provided at its front end with a crank for turning it, and operated as before explained in connection with the color screen.

The mask can be a transparent plate having a portion or portions thereof rendered opaque in any convenient way, or it can be of any other suitable character adapted to shield a required portion or portions of the sensitized plate from light action.

Fig. 5ª shows a mask O' adapted for use when it is necessary to expose one portion of the sensitized plate and protect the remaining portions from light action. This mask is adjustably secured by suitable jaws or holding devices 223 on a frame 224 which is mounted by telescoping rods 225 on a supporting board or shield 226 adapted to be removably mounted in the apparatus against the plate or shield 112ª. A flexible hood or bellows 227 extends from the mask frame 224 to the supporting board 226 around the light opening 228 in the latter, so that the light is confined to that portion only of the sensitized plate which is within the limits of the mask frame 224. The supporting board can be removably retained in place on a supporting guide 229 by a suitable fastening device 230 or in any other suitable way.

A photo-composing apparatus constructed as herein described is very efficient and practical in operation and enables the attainment of the various results hereinbefore mentioned. The copy can be placed in any predetermined required position and angular relation to the axis of the projecting device, and different copies can be placed in precisely like positions, when this is necessary. The operator can, by observing the position of the copy with reference to the visual register plate or layout sheet, appropriately adjust the latter and the copy so as to secure a required adjustment and then make a print from the copy in exactly this relation on the sensitized surface, which is adjusted simultaneously with the register plate or layout sheet and always occupies an exactly corresponding operative position. He can also, in a similar manner, place the mask so as to obtain accurately the different results required in various different jobs or different kinds of work. When the swing frames C C' are swung out from in front of the mask, the latter is accessible and can be readily placed in position and adjusted as required.

By yieldingly mounting the various parts of the apparatus as explained, they are not subject to displacement and consequent misregister, as in the case of machines which are affected by vibrations in the vicinity thereof. The overhead support also permits the operative to move freely around the apparatus to make the various adjustments without being obstructed by the various parts of the frame. The operating handles for the several adjusting mechanisms and the position-indicating devices are all readily accessible. The apparatus enables the production in a rapid and accurate manner, of duplicate negatives or positives having repeat or multiple prints of varied sizes from the same transparent or opaque copy, or composition prints of varied sizes and kind from a series of different sized copies all in exact register in predetermined locations as required on the sensitized plate or plates.

I claim as my invention:

1. In a photographic projection apparatus, the combination of a photographic projecting device, a holder for a sensitized surface, a copy holder, means for centering a copy thereon, a support provided with means for detachably securing said copy holder thereon with the holder and copy in predetermined positions relative to the axis of said projecting device to permit a ready removal of the copy holder from and replacement on the support, and means for effecting relative adjustments of the projecting device, copy holder and sensitized surface toward and from each other.

2. In a photographic projection apparatus, the combination of a photographic projecting device, a holder for a sensitized surface, a copy holder, means for centering a copy thereon, a support provided with means for securing said copy holder in a predetermined position thereon relative to the axis of said projecting device, means for adjusting said support rotatably about said axis, and means for effecting relative adjustments of the projecting device, copy holder and sensitized surface toward and from each other.

3. In a photographic projection apparatus, the combination of a photographic projecting device, a holder for a sensitized surface, a copy holder, means for centering a a copy thereon, a support provided with means for detachably securing said copy holder thereon with its center coincident with the center of said support, means for adjusting said support rotatably about said centers, and means for effecting relative adjustments of the projecting device, copy holder and sensitized surface toward and from each other.

4. In a photographic projection apparatus, the combination of a photographic projecting device, a holder for a sensitized surface, a copy holder, means for centering a copy thereon, a support provided with means for detachably securing said copy holder thereon with the holder and copy in predetermined positions relative to the axis of said projecting device to permit a ready removal of the copy holder from and replacement on the support, means for adjusting the sensitized surface for exposing different portions thereof, and means for effecting relative adjustments of the projecting device, copy holder and sensitized surface toward and from each other.

5. In a photographic projection apparatus, the combination of a photographic projecting device, a holder for a sensitized surface, a copy holder, means for centering a copy thereon, a support provided with means for detachably securing said copy holder thereon with its center coincident with the center of said support, means for adjusting said support rotatably about said centers, means for adjusting the sensitized surface for exposing different portions thereof, and means for effecting relative adjustments of the projecting device, copy holder and sensitized surface toward and from each other.

6. In a photographic projection apparatus, the combination of a photographic projecting device, a holder for a sensitized surface, a copy holder provided with devices for holding a copy thereon, means for adjusting said devices for centering the copy on the copy holder, a support provided with adjustable means for securing said copy holder thereon with the holder and copy in predetermined positions relative to the axis of said projecting device, and means for effecting relative adjustments of the projecting device, copy holder and sensitized surface toward and from each other.

7. In a photographic projection apparatus, the combination of a photographic projecting device, a holder for a sensitized surface, a holder for a registering surface, said holders being mounted to place said surfaces separately in like positions opposite the projecting device, means for similarly adjusting said holders to place different corresponding portions of the surfaces carried thereby in position for exposure, a copy holder, and means for effecting relative adjustments of the projecting device, copy holder and sensitized surfaces toward and from each other.

8. In a photographic projection apparatus, the combination of a photographic projecting device, a holder for a sensitized surface, a holder for a registering surface, said holders being mounted to swing to and from corresponding operative relations to the projecting device, means for similarly adjusting said holders to place different corresponding portions of the surfaces carried thereby in position for exposure, a copy holder, and means for effecting relative adjustments of the projecting device, copy holder and sensitized surfaces toward and from each other.

9. In a photographic projection apparatus, the combination of a photographic projection device, a holder for a sensitized surface, a holder for a registering surface, said holders being mounted to place said surfaces separately in like positions opposite the projecting device, means for similarly adjusting said holders to place different corresponding portions of the surfaces carried thereby in position for exposure, a copy support, means for adjusting the copy thereon relative to the axis of the projecting device and means for effecting relative adjustments of the projecting device, copy support and sensitized surfaces toward and from each other.

10. In a photographic projection apparatus, the combination of a photographic projecting device, a holder for a sensitized surface, a holder for a registering surface, said holders being mounted to place said surfaces separately in like positions opposite the projecting device, means for similarly adjusting said holders to place different corresponding portions of the surfaces carried thereby in position for exposure, a copy holder, means for centering a copy thereon, a support provided with means for securing said copy holder thereon with its center coincident with the center of said support, means for adjusting said support, rotatably about said centers, and means for effecting relative adjustments of the projecting device, copy holder and sensitized surface toward and from each other.

11. In a photographic projection apparatus, the combination of a photographic projecting device, a holder for a sensitized surface, means for adjusting the sensitized surface relative to the axis of the projecting device, a copy support, means for securing a copy thereon, a mask, means for supporting the same to mask a desired portion of the sensitized surface, and means for effecting relative adjustments of the projecting device, copy support, mask and sensitized surface toward and from each other.

12. In a photographic projection apparatus, the combination of a photographic projecting device, a holder for a sensitized surface, means for adjusting the sensitized surface relative to the axis of the projecting device, a copy support, means for securing a copy thereon in a predetermined position relative to said axis, means for adjusting the copy rotatably about said axis, a mask, a mask holder, a support into and from which said mask holder is insertable and removable laterally relatively to said axis, means for supporting the same to mask a desired portion of the sensitized surface, and means for effecting relative adjustments of the projecting device, copy support and sensitized surface toward and from each other.

13. In a photographic projection apparatus, the combination of a photographic projecting device, a holder for a sensitized surface, a holder for a registering surface, said holders being mounted to place said surfaces separately in like position opposite the projecting device, means for similarly adjusting said holders relative to the axis of the projecting device, a copy support, means for securing a copy thereon, a mask, means for adjustably supporting the same to mask a desired portion of the sensitized surface or registering surface, and means for effecting relative adjustments of the projecting device, copy support and sensitized surface toward and from each other.

14. In a photographic projection apparatus, the combination of a photographic projecting device, a holder for a sensitized surface, a holder for a registering surface, said holders being mounted to place said surfaces separately in like positions opposite the projecting device, means for similarly adjusting said holders relative to the axis of the projecting device, a copy support, means for securing a copy therein in a predetermined position relative to said axis, means for adjusting said copy rotatably about said axis, a mask, means for adjustably supporting the same to mask a desired portion of the sensitized surface or registering surface, and means for effecting relative adjustments of the projecting device, copy support and sensitized surface toward and from each other.

15. In a photographic projection apparatus, the combination of a photographic projecting device, a holder for a sensitized surface, a holder for a transparent visual register surface, said holders being mounted to place said surfaces separately in like positions opposite the projection device, means for similarly adjusting said holders relative to the axis of the projecting device, a copy support, means for securing a copy thereon, a mask, means for supporting the same to mask a desired portion of the sensitized surface or visual register surface, and means for effecting relative adjustments of the projecting device, copy support and sensitized surface toward and from each other.

16. In a photographic projection apparatus, the combination of a photographic projecting device, a holder for a sensitized surface, a holder for a transparent visual register surface, said holders being hinged and adapted to swing for placing said surfaces separately in like positions opposite the projection device, means for similarly adjusting said holders relative to the axis of the projecting device, a copy support, means for securing a copy thereon, a mask, means for adjustably supporting the same in rear of said swinging holders so that the mask is accessible and can be adjusted when the swinging holders are swung from in front of the same, and means for effecting relative adjustments of the projecting device, copy support and sensitized surface toward and from each other.

17. The combination of a holder for a sensitized surface, a photographic projection device and a copy support, a resiliently mounted overhead support, and supporting carriages for said holder, said projection device and said copy support movably mounted on said overhead support to permit relative movements between said holder, said projection device and said copy support.

18. The combination of a holder for a sensitized surface, a photographic projection device, a copy support for holding a copy in a predetermined position, a rigid longitudinal overhead supporting member, means for resiliently supporting said member, guides on said member, and carriages movable on said guides and supporting and permitting relative movements between said holder, said projection device and said copy support.

19. The combination of a holder for a sensitized surface, a photographic projection device, a copy support, a rigid longitudinal overhead supporting member resiliently supported at its opposite ends on fixed parts of the apparatus, a guide on said member, carriages movable on said guide and supporting and permitting relative movements between said projection device and said copy support, a second guide on said member supporting and permitting relative movements of said holder for said sensitized surface, in a direction perpendicular to the direction of movement of said carriages for said projection device and said copy support.

20. The combination of a holder for a sensitized surface, a photographic projection device, a copy support, an overhead horizontal supporting member, a stationary upright, springs supporting one end of said horizontal member from said upright, a depending member secured to the opposite end of said horizontal member, a stationary base, springs supporting said depending member from said base, means depending from said horizontal member and supporting said projection device and said copy support, and means on said depending member supporting said holder for said sensitized surface.

21. The combination of a holder for a sensitized surface, a photographic projection device, a copy support, a resiliently mounted overhead support, depending supporting means on said overhead support for said holder for the sensitized surface, a main carriage on said depending supporting means, a vertical carriage on said main carriage, a carrying frame for said holder on said vertical carriage, and means for permitting relative movements between said main carriage and said vertical carriage to adjust said sensitized surface relative to said projection device and said copy support.

22. The combination of a holder for a sensitized surface, a photographic projection device, a copy support, a resiliently mounted overhead support on which said holder and copy support are mounted, depending supporting means on said overhead support for said projection device, a guide on said overhead support on which said depending supporting means is movable in the direction of the axis of the projection device to place said projection device into operative relation with said sensitized surface and said copy support, and means on said overhead support for moving said carriage.

23. The combination of a holder for a sensitized surface, a photographic projection device, a copy support, a resiliently mounted overhead support on which said holder and copy support are mounted, depending supporting means on said overhead support for said projection device, a guide on said overhead support on which said depending means is movable in the direction of the axis of the projection device, a toothed rack on said overhead support, means on said depending means engaging said rack for moving said depending means to adjust said projection device towards and from said sensitized surface and said copy support.

24. The combination of a holder for a sensitized surface, a photographic projection device, a copy support, an overhead horizontal supporting member, a carriage for said projection device movable on said overhead support, cooperating means on said support and carriage for moving said carriage to effect a coarse adjustment for said projection device, and means adjacent to said holder for the sensitized surface and operatively connected to said carriage for effecting a fine adjustment of said projection device.

25. The combination of a holder for a sensitized surface, a photographic projection device, a copy support, an overhead horizontal supporting member, a carriage for said copy support, a guide on said overhead support for said carriage, and cooperating means on said overhead support and said carriage for moving said carriage on said guide to place said copy support into operative relation to said projection device and said sensitized surface.

26. The combination of a holder for a sensitized surface, a photographic projection device, a copy support, an overhead horizontal supporting member, a carriage for said copy support movable on said overhead support, a rack on said overhead support, means on said carriage and engaging said rack for moving said carriage to effect a coarse adjustment for said copy support, and means adjacent to said holder for the sensitized surface and operatively connected to said carriage for effecting a fine adjustment of said copy support.

27. The combination of a holder for a sensitized surface, a photographic projection device, a copy support, a resiliently mounted overhead support, depending supporting means on said overhead support for said copy support, a guide on said overhead support on which said depending means is movable, a toothed rack on said overhead support, means on said depending means engaging said rack for moving said depending means to adjust said copy support relative to said projection device and said sensitized surface.

28. The combination of a holder for a sensitized surface, a photographic projection device, a copy support, an overhead horizontal supporting member, a guide and a toothed rack on said overhead support, a carriage for said projection device, and a carriage for said copy support, each of said carriages being movable on said guide and having means engaging said rack to move said carriages for adjusting said projection device and said copy support relative to each other and to said sensitized surface.

29. The combination of a holder for a sensitized surface, a photographic projection device, a copy support, an overhead horizontal supporting member, a guide and a toothed rack on said overhead support, a carriage for said projection device, and a carriage for said copy support, each of said carriages being movable on said guide and having means engaging said rack to move said carriages for effecting a coarse adjustment for said projection device and said copy support, and means adjacent to the holder for the sensitized surface and operatively connected to said carriages for effecting a fine adjustment of said projection device and said copy support.

30. The combination of a holder for a sensitized surface, a photographic projection device, a copy support, an overhead horizontal supporting member, a guide and a toothed rack on said overhead support, a carriage for said projection device, and a carriage for said copy support, each of said carriages being movable on said guide and having means engaging said rack to move said carriages for effecting a coarse adjustment for said projection device and said copy support, and separate and independently operable means on said overhead support operatively connected respectively to said carriages for said projection device and said copy support for effecting a fine adjustment of said projection device and said copy support.

31. In a photographic projection apparatus, the combination of holders for a sensitized surface and another surface, a projection device, a copy support, laterally swinging carrying frames on which said holders for said surfaces are mounted to interchangeably place said surfaces in like operative positions relatively to said projection device, and means for adjusting said holders parallel with said surfaces when in said operative positions for exposing different portions of said surfaces.

32. In a photographic projection apparatus, the combination of holders for two sensitized surfaces, a projection device, a copy support, two oppositely disposed carrying frames for said holders mounted to swing laterally to place said sensitized surfaces in corresponding operative positions relative to said projection device, and means for adjusting said holders parallel with the sensitized surface when in said operative position for exposing different portions of the sensitized surfaces.

33. In a photographic projection printing apparatus, the combination of a holder for a sensitized surface, a projection device, a copy support, a resiliently mounted overhead support from which said projection device and said copy support are suspended, means depending from said overhead support on which said holder for said sensitized surface is mounted to swing laterally to and from an operative position relative to said projection device, and means for adjusting said holder parallel with said sensitized surface when in said operative position for printing on different portions of the sensitized surface.

34. In a photographic projection printing apparatus, the combination of a projection device, a copy support, a resiliently mounted overhead support from which said projection device and said copy support are suspended, a frame mounted on said overhead support, two carriages arranged in said frame, and a plurality of holders for sensitized surfaces mounted on one of said carriages to swing laterally in opposite directions for placing said sensitized surfaces in corresponding operative positions relative to said projection device, said carriages being adjustable in directions perpendicular to each other parallel with said sensitized surface when said surface is in said operative position.

35. In a photographic projection printing apparatus, the combination of a resiliently mounted support, a copy support constructed to hold a copy in a predetermined position, a projecting device, a frame carrying two holders, one for a sensitized surface and the other for a visual register surface, said copy support, projecting device and holder frame being supported by said resiliently mounted support, and means for effecting relative adjustments of said copy support, projecting device and holder frame.

36. In a photographic projection printing apparatus, the combination of a resiliently mounted support, a copy support constructed to hold a copy in a predetermined position, a projecting device, a frame carrying two holders, one for a sensitized surface and the other for a visual register surface, a mask for the sensitized surface, said copy support, projecting device, mask and holder frame being supported by said resiliently mounted support, and means for effecting relative adjustments of said copy support, projecting device and holder frame.

37. In a photographic projection printing apparatus, the combination of a resiliently mounted overhead support, a copy support constructed to hold a copy in a predetermined position, a projecting device, a frame carrying two holders, one for a sensitized surface and the other for a visual register surface, said copy support, projecting device and holder frame being suspended from said resiliently mounted support, and means for effecting relative adjustments of said copy support, projecting device and holder frame.

Witness my hand this 26 day of September, 1919.

WILLIAM C. HUEBNER.

Witnesses:
M. J. PITMAN,
A. L. McGEE.